Feb. 9, 1965  J. F. JOHNSON ETAL  3,169,024
SEAL ASSEMBLY FOR ROTATABLE SHAFT
Filed May 17, 1961
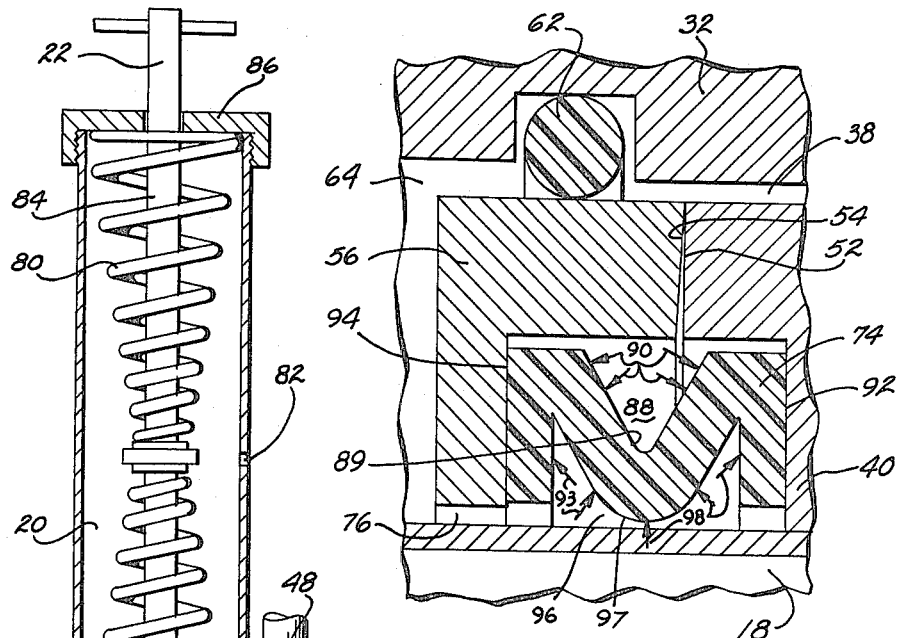
FIG. 3
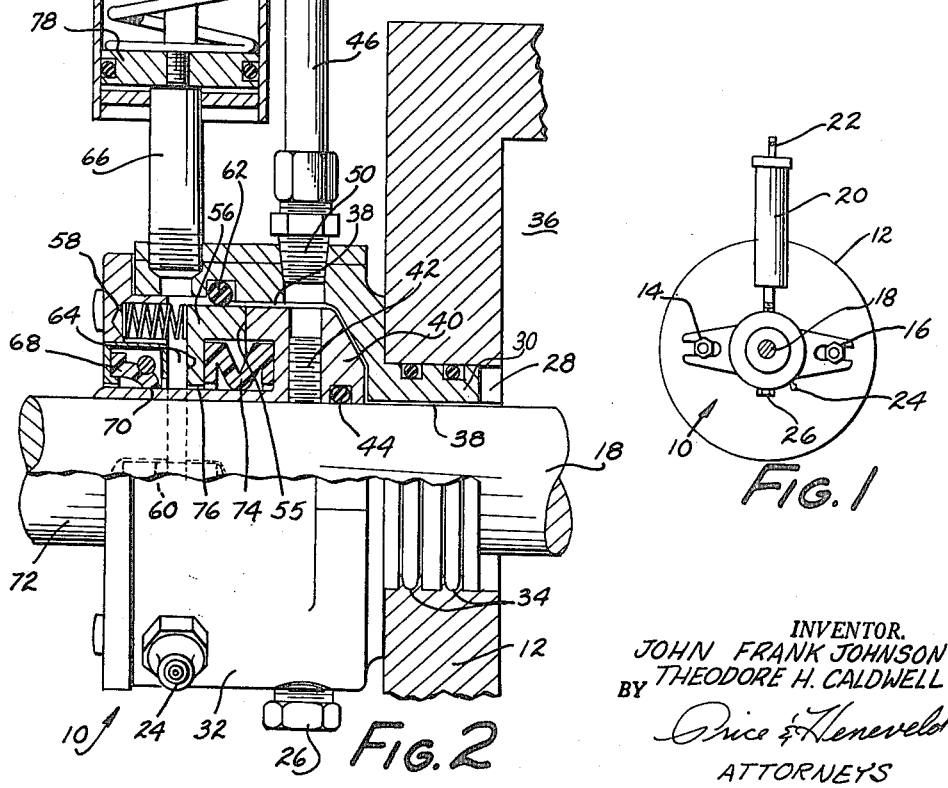
FIG. 2
FIG. 1
INVENTOR.
JOHN FRANK JOHNSON
BY THEODORE H. CALDWELL
*Price & Heneveld*
ATTORNEYS

United States Patent Office 3,169,024
Patented Feb. 9, 1965

3,169,024
SEAL ASSEMBLY FOR ROTATABLE SHAFT
John Frank Johnson, 306 N. Harrison St., and Theodore H. Caldwell, P.O. Box 227, both of Ludington, Mich.
Filed May 17, 1961, Ser. No. 110,682
9 Claims. (Cl. 277—2)

This invention concerns mechanical seals, and particularly seals for sealing the impeller shaft of pumps used to convey corrosive or gritty chemicals.

The tight sealing of pump impeller shafts against leakage of certain types of chemicals has long been a serious problem in the chemical industry. For one, if the chemical substance being pumped contained hard particles, the particles often became caught between the sealing surfaces of the seal, forcing the sealing surfaces apart and permitting leakage of the substance through the seal. Also, in those prior art seals in which a sealing fluid under pressure was employed, particularly one with a low surface tension such as oil, the sealing fluid had a tendency to work its way through the seal and leak into the chemical substance as soon as the pressure of the chemical substance dropped below that of the sealing fluid.

The present invention overcomes these difficulties by providing a resilient sealing member which is so shaped that any pressure unbalance between its two faces causes it to expand into a positive, auxiliary seal which prevents leakage of either the chemical substance or sealing fluid through the primary sealing surface.

It is therefore the object of this invention to provide a mechanical seal suitable for use with corrosive or gritty chemical substances, and which prevents contamination of the chemical substance by backflow of the sealing fluid.

It is a further object of this invention to provide a mechanical seal which will properly align itself even though its hold-down bolts are unevenly tightened.

It is a still further object of this invention to provide a sealing fluid system in which the sealing fluid can be easily maintained under a substantially constant pressure, and the level of sealing fluid supply can be continuously observed.

These and other objects of this invention will be apparent from the following specification, taken in connection with the attached drawings in which:

FIG. 1 is an end view of the device of this invention, looking from the outward end toward the inward end;

FIG. 2 is a side elevation, partly in cross section, of the device of this invention; and FIG. 3 is an enlarged detail of the area of FIG. 2 encompassed by the line III.

Basically, this invention teaches the use of a primary metal-to-metal seal along an annular surface between a rotary element and a stationary element biased against it. This primary seal is backed up by a secondary or auxiliary seal consisting of a resilient sealing member which normally can rotate freely with respect to both the rotary and the stationary elements. Normally, the resilient sealing member is in fairly loose contact with both the rotating and the stationary element, so that a sealing fluid such as oil introduced into the seal housing outwardly of the resilient sealing member can penetrate past the resilient sealing member in an inwardly direction and reach the primary sealing surface for purposes of lubrication. However, the resilient sealing member is so shaped that whenever a momentary failure of the primary seal due to the presence of a grit particle occurs, the resulting pressure unbalance between the inward and outward faces of the resilient sealing member presses the resilient sealing member into firm contact with both the rotating and stationary elements. This prevents the sealing fluid which is located inwardly of the resilient sealing ring from being pushed outwardly past the resilient sealing ring by the pressure of the substance being pumped, and thus creates a back pressure which prevents the pumped substance from entering the primary sealing surface. Likewise, if the pressure of the pumped substance is removed, a pressure differential is applied to the resilient sealing member in the opposite direction which again presses the sealing member into intimate contact with the rotating and stationary elements so as to prevent sealing fluid from leaking past the primary seal and contaminating the pumped substance.

It should be understood that the term "outward" as used in this specification refers to the direction in which the pumped substance would flow if it were to escape through the seal toward the driven end 72 of shaft 18. Conversely, the term "inwardly" is used to designate the opposite direction. Thus, the sealing surface 55 is positioned outwardly of passage 38, the resilient sealing member 74 is positioned outwardly of the sealing surface 55 and the passage 76 is positioned outwardly of the resilient sealing member 74.

Other novel features of the apparatus of this invention include a sealing fluid pressurizing system with a reservoir in which the sealing fluid is compressed by a spring-loaded piston. Sealing fluid under pressure can be injected into the device under pressure through an appropriate fitting, and over-pressurizing of the fluid is avoided by providing a port in the reservoir which is opened by the piston when the spring reaches its maximum allowable compression.

The inwardmost portion of the housing of this device is elongated so that, when it is fitted into the pump gland, it serves as an alignment means which keeps the housing aligned with the pump axis even though the hold-down bolts which connect the housing to the pump are unequally tightened.

Referring now to the drawings, FIG. 1 generally shows the seal of this invention at 10. The seal 10 is affixed to a pump housing 12 by hold-down bolts 14, 16. The seal 10 serves to seal the drive shaft 18 of the pump against leakage therealong of the pumped substance. A sealing fluid reservoir 20 carrying an indicator handle 22 is provided at the top of the seal 10 to keep the sealing fluid (e.g. oil) within the seal 10 under constant pressure. An oil entry fitting 24 is provided for supplying oil to the sealing fluid reservoir 20, and a drain plug 26 may be provided to drain the housing 32.

Referring now to FIG. 2, the pump housing or container 12 is shown to have an opening 28 formed in its wall. The drive shaft or impeller shaft 18 enters the pump housing 12 through the opening 28. Closely fitted into the opening 28 is the extension 30 of the outer housing 32 of the seal 10. The close fit of extension 30 in aperture 28 assures proper alignment of the seal 10 with shaft 18. O-rings 34 seal the outside of extension 30 against leakage of the pumped substance therearound. The only leakage path open to the pressurized substance 36 contained within the pump housing 12 is along shaft 18 through annular passage 38, and around the buffer plate 40 fastened to shaft 18 by anchor screw 42 and sealed therefrom by O-ring 44. From the pump discharge (not shown) a controlled amount of the substance is permitted to flow through pipe 46 and passage 38 into the pump housing 12. The amount of substance flowing through pipe 46 can be controlled by a valve 48, and this substance serves as a coolant for the mechanical seal 10. The fitting 50 of pipe 46 is preferably so located that access to the anchor screw 42 may be had when the pipe 46 is removed.

The buffer plate 40 has an annular superficies 52 (FIG. 3) which is in rotating engagement with an annular superficies 54 of the inner housing 56. These annular superficies define a sealing surface 55 (FIG. 2) between them. In FIG. 3, the inclination of superficies 54 is grossly exaggerated for clarity. The inner housing 56 is biased toward the buffer member 40 by springs 58, and is held against rotation by anchor pins 60. An O-ring 62 forms a stationary seal between the inner housing 56 and the outer housing 32 and defines the outward end of the passage 38.

The chamber 64 of outer housing 32 is filled with oil supplied to it from sealing fluid reservoir 20 through fitting 66. A resilient oil seal 68 acting against the sleeve 70 which is part of buffer member 40, prevents leakage of oil from chamber 64 outwardly along shaft 18.

The oil for chamber 64 may be introduced into the apparatus through the fitting 24 in housing 32. If sufficient pressure is provided at the fitting 24, the oil rises through the fitting 66 and raises the piston 78 in reservoir 20 against the pressure of pressure springs 80 until the piston 78 clears the relief port 82. At that point, oil is discharged from the reservoir 20 through the relief port 82, and no further compression of springs 80 can take place. The indicator handle 22 connected to piston 78 by rod 84 may be provided with appropriate markings to indicate the quantity of oil present in the reservoir 20 in cooperation with the cover 86.

Operation

In use, the pressure of the oil in chamber 64 is set at a pre-determined fixed or automatically controlled pressure sufficient to substantially counteract the pressure in the pump or container 36. Such a setting also controls the maximum strain on the O-ring 62, because even if the pump is shut off and the pressure in the container 36 drops to zero, the pressure exerted on O-ring 62 will never be more than the fixed pressure of the sealing oil. Because of the fact that inner housing 56 does not rotate, and is subject to practically no axial movement in normal operation, there is no mechanical wear on the O-ring 62. Of course, the O-ring 62 has to be made of a material impervious to both the oil in chamber 64 and the substance in passage 38 (see FIG. 3). Likewise, O-rings 34 and 44 separate parts which do not move with respect to one another, and they too are therefore not exposed to wear.

In operation, the chemical substance from the pump discharge travels through fitting 50 and passage 38 into the container 36 at a rate determined by valve 48. This substance is thus present under pressure in passage 38 (FIG. 3) and tends to seep into sealing surface 55 whenever a grain of grit or the like gets caught between the superficies 52, 54 and forces them apart. If this happens, the added pressure transmitted by the substance to chamber 88, which is normally filled with oil at the pressure determined by spring 80, is applied to the inward face 89 of sealing member 74 and causes the resilient material of sealing member 74 to expand as shown by the arrows 90. This forces the top portion (in FIG. 3) of seal 74 against the sealing areas 92, 94 and creates a firm barrier which prevents the substance in passage 38 from displacing the oil in chamber 88 outwardly past sealing member 74 and thus entering the chamber 88. It should be noted in this respect that superficies 54 of the inner housing 56 is slightly inclined (e.g. one-half degree) with respect to superficies 52 of the buffer member 40 so that oil from the chamber 88 can enter between superficies 52 and 54 during normal operation for lubricating purposes.

If the pump now stops and the pressure in container 36 and passage 38 drops to zero, the pressurized oil in chamber 96 exerts pressure on the outward face 97 of sealing member 74 in the direction of the arrows 98. This pressure results in expansion of the sealing member 74 against the sealing areas 92, 94, which once again positively prevents any fluid flow across or around the sealing member 74. Thus, leakage of oil out of chamber 88 through the sealing surface 55 and into the passage 38 is prevented (escape of oil from chamber 88 would create a vacuum therein), and contamination of the pumped substance is made impossible.

As previously mentioned, the extension 30 of outer housing 32 maintains the seal of this invention in alignment with shaft 18—an important feature because misalignment of the seal with respect to the shaft can cause uneven wear of the oil seal 68 and can result in rapid loss of sealing fluid, particularly if high pressures are involved.

Although an illustrative embodiment of the invention has been described herein, it should be understood that many variations thereof are possible. Particularly, the rigid parts of this device may be constructed of plastics or other materials impervious to any chemical action of the pumped substance. In any event, the foregoing description is to be taken as an example only, and the invention is not to be limited except by the scope of the following claims.

We claim:
1. A mechanical seal comprising: a rotatable shaft; a stationary outer housing; an inner housing concentric with said outer housing, said inner housing being fixed against rotation but being slidable axially of said shaft; a buffer member having an annular superficies formed thereon adapted to rotate in sealing engagement with a corresponding superficies of said inner housing; a pair of spaced opposed seal engaging areas formed on said inner housing and said buffer member respectively; and a resilient annular sealing member resiliently held in engagement with said seal engaging areas, said outer housing being filled with a sealing fluid under pressure outwardly of said resilient sealing member, and the radial cross-section of said resilient sealing member being generally M-shaped so as to cause said resilient sealing member to engage said seal engaging areas more firmly whenever a pressure differential appears between the faces of said resilient sealing member.

2. A mechanical seal comprising: a rotatable shaft; a stationary outer housing; an inner housing concentric with said outer housing, said inner housing being fixed against rotation but being slidable axially of said shaft; a buffer member mounted on said shaft for rotation therewith, said buffer member having an annular superficies formed thereon adapted to rotate in sealing engagement with a corresponding superficies of said inner housing; a pair of spaced opposed seal engaging areas formed on said inner housing and said buffer member respectively; and a resilient annular sealing member resiliently held in engagement with said seal engaging areas, said outer housing being filled with a sealing fluid under pressure outwardly of said resilient sealing member, the radial cross-section of said resilient sealing member being shaped so as to cause said resilient sealing member to engage said seal engaging areas more firmly whenever a pressure differential appears between the faces of said resilient sealing member, and the spacing between said superficies diminishing slightly in a direction radially away from the axis of said shaft.

3. A mechanical seal for sealing an aperture formed in a thick-walled portion of a container comprising: a rotatable shaft; a stationary outer housing; an inner housing concentric with said outer housing, said inner housing being fixed against rotation but being slidable axially of said shaft; a buffer member mounted on said shaft for rotation therewith, said buffer member having an annular superficies formed thereon adapted to rotate in sealing engagement with a corresponding superficies of said inner housing; a pair of spaced opposed seal engaging areas formed on said inner housing and said buffer member respectively; a resilient annular sealing member resiliently held in engagement with said seal engaging areas, said outer housing being filled with a sealing fluid under pressure outwardly of said resilient sealing member, and the radial cross-section of said resilient sealing member being shaped so as to cause said resilient sealing member to engage said seal engaging areas more firmly whenever a pressure differential appears between the faces of said resilient sealing member, and the spacing between said superficies diminishing slightly in a direction radially away from the axis of said shaft; and an extension on said outer housing constituting the inwardmost portion thereof, said extension being of substantially the same radial dimensions as said aperture, and of sufficient axial length to maintain said housing in alignment with said aperture.

4. A mechanical seal comprising: a rotatable shaft; a stationary housing; an annular sealing surface between first and second rigid elements biased toward each other, said first rigid element being fixed with respect to said shaft, and said second rigid element being fixed against rotation with respect to said housing; a resilient sealing member interposed between said elements and rotatable with respect to both of them; a fluid under pressure filling the interior of said housing outwardly of said sealing member; and means for maintaining said fluid under a substantially constant pressure, said means comprising a fluid reservoir in communication with the interior of said housing, and a spring-loaded piston in said reservoir subjecting the fluid therein to pressure.

5. A mechanical seal comprising: a rotatable shaft; a stationary housing; an annular sealing surface between first and second rigid elements biased toward each other, said first rigid element being fixed with respect to said shaft, and said second rigid element being fixed against rotation with respect to said housing; a resilient sealing member interposed between said elements and rotatable with respect to both of them; a fluid under pressure filling the interior of said housing outwardly of said sealing member; means for maintaining said fluid under a substantially constant pressure, said means comprising a fluid reservoir in communication with the interior of said housing, and a spring-loaded piston in said reservoir subjecting the fluid therein to pressure; means for introducing fluid into said housing and reservoir against the pressure of said piston, and means in said reservoir to discharge fluid from said reservoir when said spring has been compressed a predetermined amount.

6. A mechanical seal comprising: a rotatable shaft; a stationary housing; an annular sealing surface between first and second rigid elements biased toward each other, said first rigid element being fixed with respect to said shaft, and said second rigid element being fixed against rotation with respect to said housing; a resilient sealing member interposed between said elements and rotatable with respect to both of them; a fluid under pressure filling the interior of said housing outwardly of said sealing member; means for maintaining said fluid under a substantially constant pressure, said means comprising a fluid reservoir in communication with the interior of said housing, and a spring-loaded piston in said reservoir subjecting the fluid therein to pressure; means for introducing fluid into said housing and reservoir against the pressure of said piston, and means in said reservoir to discharge fluid from said reservoir when said spring has been compressed a predetermined amount; and combined handle and indicator means connected to said piston for manually moving said piston and indicating its position within said reservoir.

7. A mechanical seal comprising: a rotatable shaft; a stationary outer housing; an inner housing assembly concentric with said outer housing, said inner housing assembly being fixed against rotation but having a portion slidable axially of said shaft; a buffer member in said housing, rotatable with said shaft and having annular sealing surface means in engagement with said inner housing portion; said inner housing portion being biased toward said buffer member to maintain said sealing engagement; a pair of spaced, opposed seal engaging areas formed on said inner housing assembly and said buffer member respectively; and a resilient annular sealing member resiliently held in engagement with said seal engaging areas, said outer housing being filled with a sealing fluid under pressure outwardly of said resilient sealing member, and the radial cross-section of said resilient sealing member being generally M-shaped so as to cause said resilient sealing member to axially expand and contract to constantly engage said seal engaging areas firmly in response to the pressure differential thereon.

8. A mechanical seal comprising: a rotatable shaft; a stationary outer housing; an inner housing assembly concentric with said outer housing, including first portions secured to said outer housing, and second floating portions; said inner housing assembly being fixed against rotation but said second portions being slidable axially of said shaft inside said outer housing; a buffer member mounted on said shaft for rotation therewith; annular sealing surface means on said buffer member adapted and positioned to rotate in sealing engagement with a corresponding sealing surface means on said inner housing assembly; a pair of spaced opposed seal engaging areas on said inner housing assembly and said buffer member respectively; and a resilient annular sealing member resiliently held in engagement with said seal engaging areas, said outer housing being filled with a sealing fluid under pressure outwardly of said resilient sealing member, the radial cross-section of said resilient sealing member being shaped with axially expandable portions and axially outer sealing surfaces so as to cause said resilient sealing member to engage said seal engaging areas firmly in response to pressure between the faces of said resilient sealing member.

9. A mechanical seal for sealing a container against leakage therefrom around a rotatable shaft extending through and out of an opening in the container, comprising: a stationary housing adapted to be mounted to the container, having an opening on one end adapted to fit around the shaft and an enlarged opening on the other end providing access to said housing; a rotatable annular member in said housing and having attachment means for attachment thereof to the shaft to rotate therewith; end plate holding and seal assembly means attached to and sealingly engaged with said housing at said enlarged opening, and including a central opening with seal means to receive the shaft, including resilient axially extending biasing means, and including an annular floating ring inside said housing and engaged with said biasing means and biased toward said rotatable member; first sliding, annular sealing surface means between said floating ring and said rotatable member; and second auxiliary rotatable seal means between said holding and seal assembly means and said rotatable member, radially inwardly of said first sliding sealing surface means, and being of M-shaped configuration in cross-section to be axially expandable and compressible under fluid pressure to create sealing action on the outside surfaces of its legs.

References Cited in the file of this patent
UNITED STATES PATENTS

| | | |
|---|---|---|
| 2,173,075 | Nelson | Sept. 12, 1939 |
| 2,480,908 | Davies | Sept. 6, 1949 |
| 2,797,939 | Laser | July 2, 1957 |
| 2,826,465 | Gordon | Mar. 11, 1958 |